(12) United States Patent
Sato et al.

(10) Patent No.: US 11,136,223 B2
(45) Date of Patent: Oct. 5, 2021

(54) VACUUM EXTRACTION FOR MATERIAL SORTING APPLICATIONS

(71) Applicant: AMP Robotics Corporation, Louisville, CO (US)

(72) Inventors: Moana Sato, Denver, CO (US); Matanya B. Horowitz, Golden, CO (US); Cameron Douglas, Boulder, CO (US)

(73) Assignee: AMP Robotics Corporation, Louisville, CO (US)

( * ) Notice: Subject to any disclaimer, the term of this patent is extended or adjusted under 35 U.S.C. 154(b) by 109 days.

(21) Appl. No.: 16/559,299

(22) Filed: Sep. 3, 2019

(65) Prior Publication Data
US 2020/0087118 A1    Mar. 19, 2020

Related U.S. Application Data

(60) Provisional application No. 62/732,689, filed on Sep. 18, 2018.

(51) Int. Cl.
*G06N 3/06* (2006.01)
*B66C 1/02* (2006.01)
*B07C 5/36* (2006.01)

(52) U.S. Cl.
CPC ............ *B66C 1/0268* (2013.01); *B07C 5/368* (2013.01); *B66C 1/025* (2013.01); *B66C 1/0218* (2013.01); *G06N 3/06* (2013.01)

(58) Field of Classification Search
CPC ..... B66C 1/0268; B66C 1/0218; B66C 1/025; B07C 5/368; B07C 5/363; B07C 5/367; G06N 3/06
See application file for complete search history.

(56) References Cited

U.S. PATENT DOCUMENTS

| 3,716,307 A | 2/1973 | Hansen |
| 5,040,353 A * | 8/1991 | Evans .................. B07C 5/3404 |
| | | 53/54 |

(Continued)

FOREIGN PATENT DOCUMENTS

| WO | 2008150903 A1 | 12/2008 |
| WO | 2011115481 A1 | 9/2011 |
| WO | 2012067512 A2 | 5/2012 |

OTHER PUBLICATIONS

International Searching Authority, "Invitation to Pay Additional Fees from PCT Application No. PCT/US2019/049361", from Foreign Counterpart to U.S. Appl. No. 16/559,299, dated Nov. 20, 2019, pp. 1-12, Published: WO.

(Continued)

*Primary Examiner* — Patrick H Mackey
(74) *Attorney, Agent, or Firm* — Van Pelt, Yi & James LLP

(57) ABSTRACT

Systems and methods for vacuum extraction for material sorting applications are provided. In one embodiments, a vacuum object sorting system comprises: a vacuum extraction assembly that includes at least one vacuum extractor device having an inlet and an outlet, wherein the at least one vacuum extractor device is configured to convert a controlled compressed air stream into a channeled vacuum airflow entering the inlet and exiting the outlet; and an object recognition device coupled to sorting control logic and electronics, wherein the controlled compressed air stream is controlled in response to a signal generated by the object recognition device; wherein the at least one vacuum extractor device is configured to capture a target object identified by the sorting control logic and electronics utilizing the channeled vacuum airflow, and further utilizing the chan- (Continued)

neled vacuum airflow, to pass the target object through the inlet and outlet to a deposit location.

27 Claims, 6 Drawing Sheets

(56) References Cited

U.S. PATENT DOCUMENTS

| | | | |
|---|---|---|---|
| 5,864,600 A | 1/1999 | Gray et al. | |
| 5,956,413 A | 9/1999 | Oste et al. | |
| 6,124,560 A * | 9/2000 | Roos | B07C 5/368 |
| | | | 209/578 |
| 6,732,897 B2 | 5/2004 | DeHart et al. | |
| 7,516,848 B1 | 4/2009 | Shakes et al. | |
| 9,785,851 B1 | 10/2017 | Torek et al. | |
| 10,016,790 B1 * | 7/2018 | Travis | B07C 5/3422 |
| 10,298,909 B2 † | 5/2019 | Peeters | |
| 10,799,915 B2 * | 10/2020 | Horowitz | C08G 61/126 |
| 2004/0055250 A1 | 3/2004 | Main et al. | |
| 2010/0131094 A1 * | 5/2010 | Green | B07C 5/368 |
| | | | 700/223 |
| 2012/0293623 A1 * | 11/2012 | Nygaard | G06T 7/0004 |
| | | | 348/46 |
| 2018/0243800 A1 * | 8/2018 | Kumar | G06N 20/00 |
| 2019/0374978 A1 * | 12/2019 | Borrell | B07C 5/367 |

OTHER PUBLICATIONS

Huang et al., "Speed/accuracy trade-offs for modern convolutional object detectors", IEEE Conference on Computer Vision and Pattern Recognition (CVPR), Jul. 2017, pp. 7310-7319, IEEE.

International Searching Authority, "International Search Report and Written Opinion from PCT Application No. PCT/US2019/049361", from Foreign Counterpart to U.S. Appl. No. 16/559,299, dated Feb. 20, 2020, pp. 1-19, Published: WO.

\* cited by examiner
† cited by third party

VACUUM EXTRACTION FOR MATERIAL SORTING APPLICATIONS

CROSS-REFERENCE TO RELATED APPLICATIONS

This patent application is a U.S. patent application claiming priority to, and the benefit of, U.S. Provisional Patent Application No. 62/732,689, titled "VACUUM EXTRACTION FOR MATERIAL SORTING APPLICATIONS" filed Sep. 18, 2018, which is incorporated herein by reference in its entirety.

BACKGROUND

Within many industrial facilities, objects are transported on conveyor belts from one location to another. Often a conveyor belt will carry an unsorted mixture of various objects and materials. In some instances, like within recycling and waste management facilities for example, some of the objects may be considered desirable (e.g. valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy and efficiency and can suffer from fatigue over the period of a shift. Human sorters also require specific working conditions, compensation, and belt speeds. Production time is lost to training the many new employees that enter as sorters, and operation costs increase as injuries and accidents occur.

The introduction of recycling robotics for sorting materials has led to increased productivity and decreased contamination for Material Recovery Facilities (MRFs). Robots have been utilized as a viable replacement, or supplement, for human sorters due to their speed, reliability, and durability. The objective of recycling robots is to recover the specific target material(s) and eject them into bunkers without introducing other materials (contaminants) into the sorted bunkers. A common technique used by these recycling robots involves the use of suction gripper. A suction cup gripper connected to a pneumatic system would generate a substantial suction force to grasp targeted objects. Application of the suction force may be curtailed once the objected is picked from conveyor belt to direct the item into the proper collection bunker.

Robotic sorting has proven to be exceptionally good at picking and placing rigid objects with surface areas greater than or equal to three square inches. Non-rigid objects such as plastic bags have a lower success rate due to their tendency to deform and lose viable surface area to wrinkles and creases and interfere with suction. Objects smaller than three square inches in cross sectional area have trouble being picked and placed into appropriate bins since suction cups have difficulty sealing on them. Moreover, the robotic apparatus used to position the suction gripper, while less expensive over time as compared to human sorters, still require a significant capital expense that leaves some material economically infeasible for collection and recycling.

For example, many Material Recovery Facilities request their customers not include items smaller than three square inches and thin film in their recycling, even though they are made of recyclable materials. Material Recovery Facilities will often tend to avoid retrieving paper since an excessive number of material and physical picks are required to accumulate an economical amount of mass. Rapidly moving mechanical elements can also present a hazard to facility personnel working near the sorting robot.

For the reasons stated above and for other reasons stated below which will become apparent to those skilled in the art upon reading and understanding the specification, there is a need in the art for system and methods for vacuum extraction for material sorting applications.

SUMMARY

In one embodiment, a vacuum object sorting system comprises: a vacuum extraction assembly that includes at least one vacuum extractor device having an inlet and an outlet, wherein the at least one vacuum extractor device is configured to convert a controlled compressed air stream into a channeled vacuum airflow entering the inlet and exiting the outlet; and an object recognition device coupled to sorting control logic and electronics, wherein the controlled compressed air stream is controlled by the sorting control logic and electronics in response to a signal generated by the object recognition device; wherein the at least one vacuum extractor device is configured to capture a target object identified by the sorting control logic and electronics utilizing the channeled vacuum airflow, and further utilizing the channeled vacuum airflow, to pass the target object through the inlet and outlet to a deposit location.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

The present disclosure illustrates various example embodiments of vacuum extraction for material sorting applications. As discussed below, a sorting machine based on vacuum extraction as described herein can quickly and accurately remove materials from a moving conveyor mechanism to allow facility operators, such as but not limited to Material Recovery Facilities, to consider a wider variety of recyclable materials and/or remove non rigid contaminants in an efficient and effective manner. In this way, smaller rigid and non-rigid materials may be captured along with relatively larger rigid materials using vacuum extraction as described herein.

More specifically, several of the embodiments presented herein disclose a vacuumed extraction assembly. In some embodiments, the vacuum extraction assembly, which would take the place of the robotic elements and suction gripper of known systems, may be (but is not limited to) a mechanically static apparatus that removes objects from a moving conveyor line (for example) using a plurality of individual vacuum extractors positioned over the moving conveyor. In some embodiments, an external control system and visual recognition system will determine which vacuum extractor of the vacuum extraction assembly to engage to pick a target object and send control signals to execute the capture action.

Figure 1:
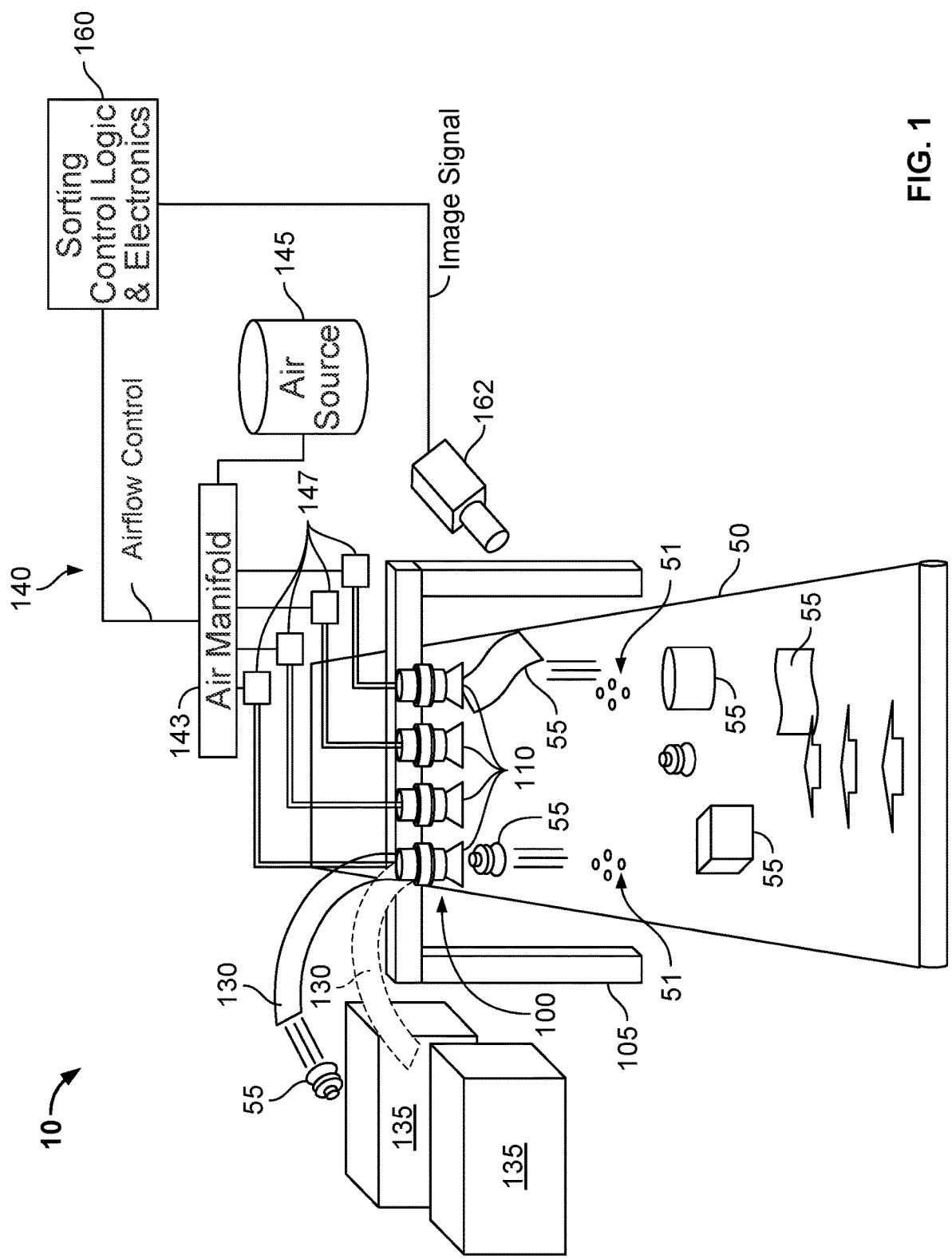
FIG. 1 is a diagram illustrating an example vacuum sorting system of one embodiment of the present disclosure.

FIG. 1 is a diagram illustrating vacuum sorting system 10 of one embodiment of the present disclosure. The vacuum extraction assembly 100 is designed to retrieve objects along the width of a moving conveyor mechanism 50, such as a conveyor belt, as depicted in FIG. 1. Although waste products travelling on a conveyer belt are used as example target objects in the example embodiments described herein, it should be understood that in alternate implementations of these embodiments, the target objects need not be waste materials but may comprise any type of material for which it may be desired to sort and/or segregate. Moreover, although a conveyer belt is used as an example conveyance mechanism for transporting the target objects within reach of the suction gripper, it should be understood that in alternate implementations of these embodiments, other conveyance mechanism may be employed. For example, for any of the embodiments described below, in place of an active conveyance mechanism such as conveyor belt, an alternate conveyance mechanism may comprise a chute, slide or other passive conveyance mechanism through and/or from which material tumbles, falls, or otherwise is gravity fed as it passes by the imaging device. In some embodiments, the conveyor mechanism 50 may comprise a conveyor mechanism or conveyor belt that comprises holes 51 which may serve to increase airflow available as intake into the vacuum extraction assembly 100. In other embodiments, the conveyor mechanism 50 may include other raised, recessed, or perforation features that increase airflow available as intake into the vacuum extraction assembly 100. For example, cleats, treads, or other raised or recessed surface features in, or on, the conveyor mechanism 50 may be included in various alternative implementations.

In the example shown in FIG. 1, vacuum extraction assembly 100 comprises a plurality of individual vacuum extractor devices 110. The devices may be mounted to a mounting structure 105 such as a mounting frame or other structure. In the example depicted, the vacuum extraction assembly 100 comprises a plurality of vacuum extractors 110 that are positioned a distance above the conveyor mechanism 50. This allows material objects 55 to pass below the multiple vacuum extractors 110. For example, the vacuum extraction assembly 100 may be positioned to give a clearance of approximately six inches. Other clearance may be provided depending on the dimensions of the objects expected on the conveyor mechanism 50. In some embodiments, the vacuum extraction assembly 100 may be adjustable so that the clearance above the conveyor mechanism 50 can be increased or decreased. For example, in some embodiments, the vacuum extraction assembly 100 can be dynamically raised to allow objects to pass if a clog or jam of materials or other obstruction is detected.

In some implementations, vacuum sorting system 10 further comprises at least one object recognition device 162. In some embodiments, the object recognition device may comprise an imaging device 162 (such as, for example, an infrared camera, visual spectrum camera, or a some combination thereof) directed at a conveyer belt 50 that transports target objects (shown at 55) within the operating reach of the vacuum sorting system 10. In some embodiments, the imaging device 162 produces a signal that is delivered to the sorting control logic and electronics 160 and which may be used by sorting control logic and electronics 160 to send airflow control signals to the vacuum control system 140 of the vacuum sorting system 10 (and in some embodiment the vacuum extraction assembly 100), in order to initiate a capture action on a target object 55. It should be understood that utilizing an imaging device for the object recognition device 162 is presented as an example implementation. The embodiments described herein, however, may implement the object recognition device 162 utilizing any form of a sensor configured for detecting, for example, non-visible electromagnetic radiation (such as a hyperspectral camera, infrared, or ultraviolet), a magnetic sensor; a capacitive sensor; or other sensors commonly used in the field of industrial automation. As such, the signal that is delivered to the sorting control logic and electronics 160 from the object recognition device 162 may comprise, but is not necessarily, an image signal.

Figure 1A:
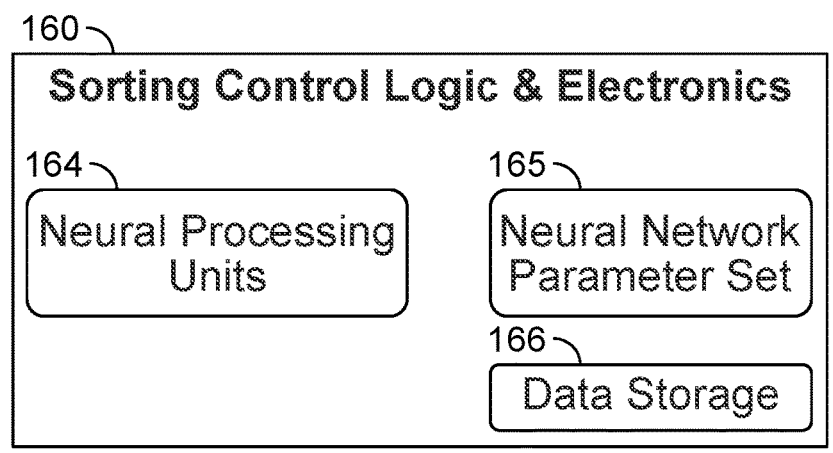
FIG. 1A is diagram illustrating an example sorting control logic and electronics of one embodiment of the present disclosure.

As shown in FIG. 1A, in some embodiments, the sorting control logic and electronics 160 comprises one or more Neural Processing Units 164, a Neural Network Parameter Set 165 (which stores learned parameters utilized by the Neural Processing Units 164), and Data Storage 166 that stores, for example, the raw images received from the imaging device 162, processed images comprising labeled data, and may further be used to store other data such as material characterization data generated by the Neural Processing Units 164. The Neural Network Parameter Set 165 and Data Storage 166 may either be implemented together on a common physical non-transient memory device, or on separate physical non-transient memory devices. In some embodiments, the Data Storage 166 may comprise a removable storage media.

In various embodiments, the sorting control logic and electronics 160 may be implemented using a microprocessor coupled to a memory that is programed to execute code to carry out the functions of the sorting control logic and electronics 160 described herein. In other embodiments, the sorting control logic and electronics 160 may additionally, or alternately, be implemented using an application specific integrated circuit (ASIC) or field programmable gate array (FPGA) that has been adapted for machine learning. In operation, in some embodiments, the imaging device 162 is directed towards the conveyor belt 50 in order to capture an overhead view of the materials 55 being transported by the conveyor belt 50. The imaging device 162 produces a signal that is delivered to the sorting control logic and electronics 160.

In some embodiments, within the sorting control logic and electronics 160, these image frames are provided input to one or more neural network and artificial intelligence algorithms (shown as the Neural Processing Units 164) to locate and identify material appearing within the image frames. A feed of image frames captured by the imaging device 162 is fed to a machine learning inference algorithm implemented by the Neural Processing Units 164. The sequence of captured image frames may be processed by multiple processing layers, or neurons, of the Neural Processing Units 164 to evaluate the correlation of specific features with features of objects that it has previously learned. Alternative algorithms to detect objects within an image include Fully Convolutional Neural Network, Multibox, Region-based Fully Convolutional Networks (R-FCN), Faster R-CNN, and other techniques commonly known to those skilled in the art as object detection, instance-aware segmentation, or semantic segmentation algorithms described in available literature. Further details regarding examples of the process of detecting objects in captured images which may be used in the present embodiments may be found in the reference Huang et al., "Speed/accuracy trade-offs for modern convolutional object detectors" The IEEE Conference on Computer Vision and Pattern Recognition (CVPR), 2017, pp. 7310-7311, which is incorporated by reference in its entirety.

Figure 2:
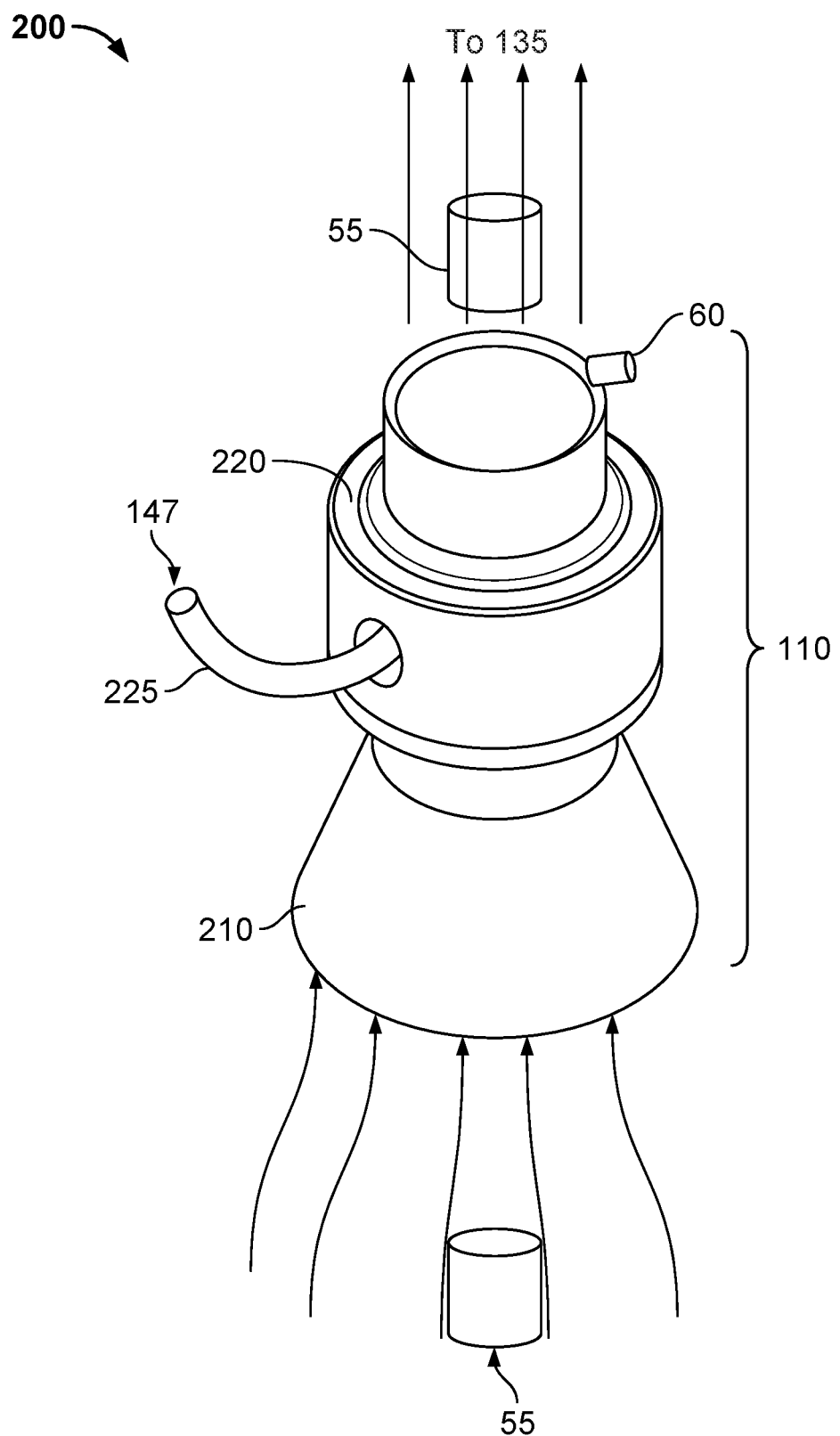
FIG. 2 is a rendering of an example vacuum extractor device assembly of one embodiment of the present disclosure.
Figure 3:
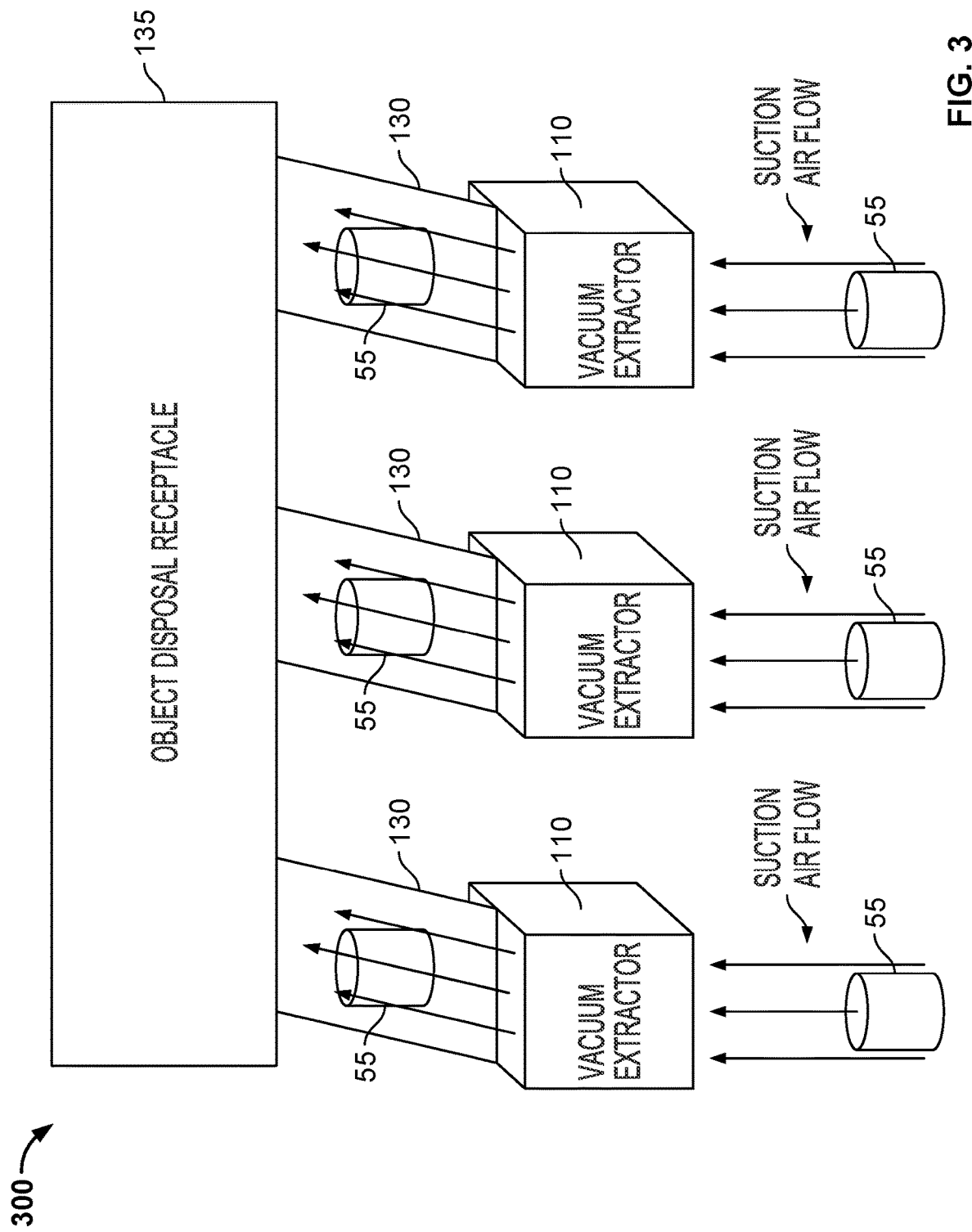
FIG. 3 is a diagram illustrating an example vacuum sorting system of one embodiment of the present disclosure.

The vacuum control system 140 provides an air supply for operating and individually controlling the vacuum extractor devices 110 of the vacuum extraction assembly 100. When the object recognition device 162 identifies an object 55 to remove from the conveyor belt 55, an electrical signal is sent to the vacuum control system 140 to activate an air supply. As illustrated in FIG. 2 and FIG. 3, upon airflow engagement, a powerful suction air flow is generated at the vacuum inlet of the selected vacuum extractor device 140, removing the target object 55 identified and selected by the sorting control logic and electronics 160 from the conveyor belt 50. This capture action is depicted generally at 200 in FIG. 2 and at 300 in FIG. 3. Each vacuum extractor device 110 can be augmented with other attachments 210, such as a funnel, to direct the airflow over a specific area or assist in guiding the material into the vacuum produced by the vacuum extractor device 110. Other attachments may include, for example, material shredders or material sorting features. In some embodiments, the inlet and exhaust of the vacuum generator 220 are augmented with attachments that improve the flow through the use of a converging cone or geometry on the inlet, and/or a diverging cone or geometry on the exhaust.

While the vacuum extractor device 110 may be controlled by the sorting control logic and electronics 160 in response to signals from the object recognition device 162, it should be understood that in other embodiments, a vacuum extractor device 110 may be manually controlled by an operator (either locally or remotely). Alternatively, they may be responsive to either manual controls and/or control signals from the sorting control logic and electronics 160. For example, the sorting control logic and electronics 160 may be bypassed by a manual override that permits the operator to control individual, or groups of, vacuum extractor device 110.

Figure 4:
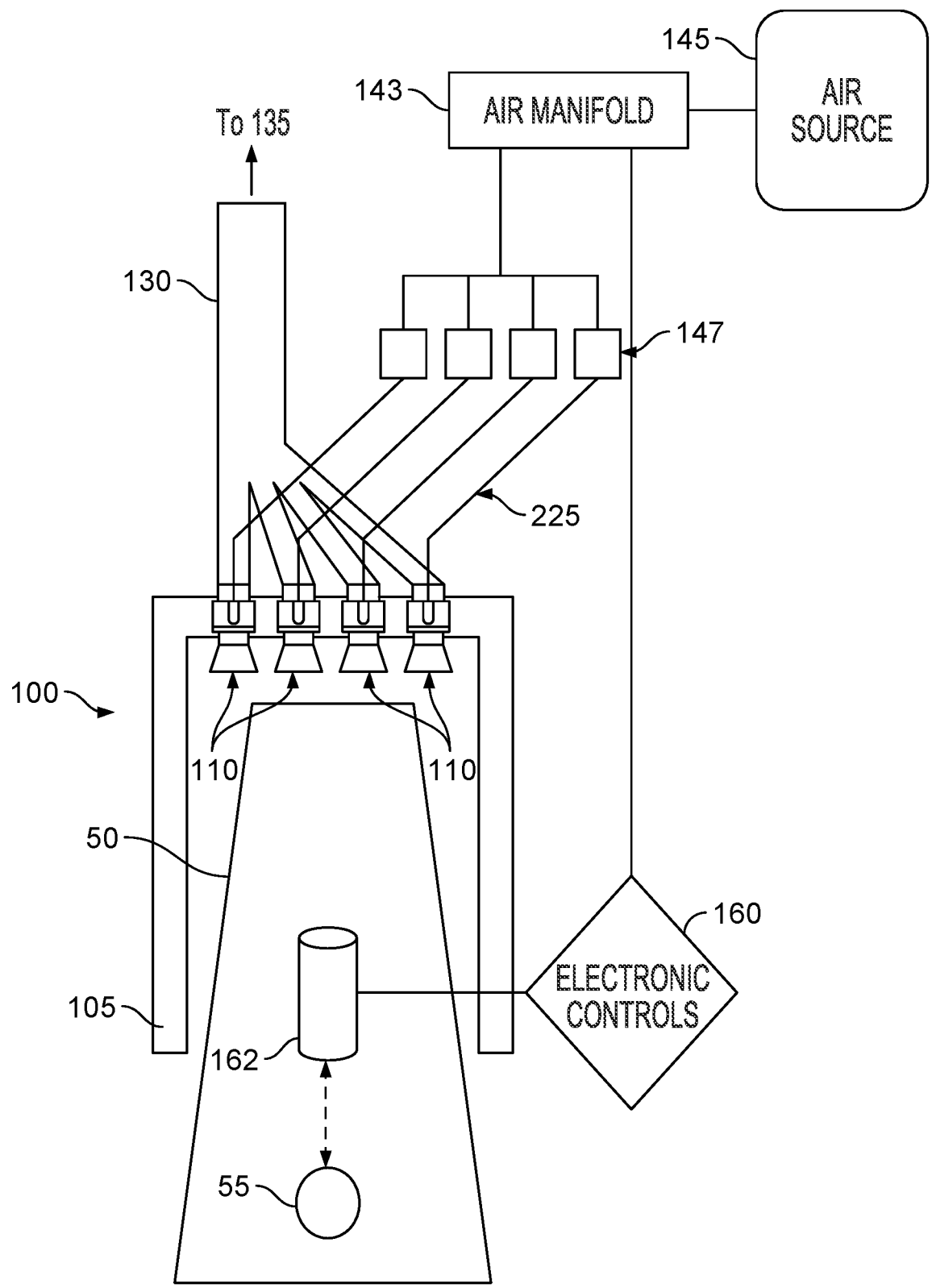
FIG. 4 is a diagram illustrating an example vacuum sorting system of one embodiment of the present disclosure.

In some embodiments, each vacuum extractor device 110 comprises a vacuum generator 220 that generates the vacuum force used to extract the object 55 from the conveyor 50, as opposed to merely communicating a vacuum force generated by the vacuum control system 140. In some embodiments, vacuum generator 220 is coupled to the vacuum control system 140 by air supply tubing 225. In some embodiments, the vacuum generator 220 comprises a compressed air driven vacuum generator, such as a Venturi and/or Coanda vacuum generator for example. That is the motive force that pulls a vacuum through vacuum extractor device 110 is the result of a flow of a compressed air stream, supplied by an air source 145 of vacuum control system 140 that flows through the vacuum generator 220. In the example embodiments depicted in FIGS. 1, 2, and 4, straight-through Venturi and/or Coanda style vacuum generators are used. With a straight-through design, the vacuum port and an exhaust path of the for each vacuum extractor device 110 may be placed inline. These unique devices can achieve high volumetric flow rates and perform exceptionally well in dirty environments because they are self-cleaning, non-clogging, and never lose suction over time. Depicted in FIG. 2, the straight-through vacuum design easily allows objects to pass through with the airflow. For example, a sensor 60 that is at the outlet of the vacuum extractor device 110 is configured to detect when a collected object fully passes through the vacuum extractor device 110 and then to send a feedback signal to the sorting control logic and electronics 160. Utilization of compressed air driven vacuum generators, such as a Venturi and/or Coanda vacuum generator, addresses the problem of pulling dirty (that is, particulate heavy) air into an intake of a vacuum motor. The utilization of a Venturi and/or Coanda vacuum generator in combination with the vacuum, extraction assembly 100 reduces the need for particulate filtration because such a vacuum system can internally separate dust particles from the airflow received through the vacuum extraction devices 110. Dust that is not separated by the vacuum system may be conveniently discharged, for example into an optional holding container, as opposed to being pulled into a vacuum motor. In some embodiments, multiple vacuums generators 220 may be attached in a series or in parallel to adjust flow and pressure at the inlet of a vacuum extraction device 110.

In operation, the positive pressure airflow applied at a pressurized air input port 225 flows across one or more Venturi and/or Coanda feature within vacuums generators 220 to create a negative air pressure that pulls air into the intake of the vacuum extraction device 110, thus creating suction at the intake capable of pulling objects 55 in and through the vacuum extraction device 110. One example of a device comprising such a Venturi vacuum generator is the "Adjustable Inducer/Venture System" by Airtrim Pneumatic Conveyance Systems described in U.S. Pat. No. 6,732,897, the contents of which are incorporated by reference herein in their entirety. See also U.S. Pat. No. 3,716,307 and U.S. Patent Publication 2004/0055250, the contents of both of which are incorporated by reference herein in their entirety.

Once the target object 55 is removed from the conveyor belt 50 and passes through the vacuum extraction device 110, in some embodiments, the materials may be transported by a hood, hoses, ducts or tubes 130 leading to a holding bin, tank, bunker or other receptacle 135 where extracted objects 55 are deposited. The particular destination for items removed from the conveyor belt may depend upon whether they are contaminants or desired materials. In some embodiments the receptacle 135 may be adjacent to the vacuum sorting system 10 while in others, it may be remotely located away from the vacuum sorting system 10. In some embodiments, the receptacle 135 may comprise a cargo area of a truck or other vehicle so that removed objects 55 are directly loaded onto the vehicle for transport. In some embodiments, the hood, hoses, ducts or tubes 130 may include controllable valves or other controllable diverters that control the material flow of removed objects 55 that have entered the suction ducting 130 in order that various object disposal locations (that is, multiple alternate receptacles 135) may be selected for any of the plurality of the vacuum extractor device 110. That is, the ducting 130 may be configurable and re-configurable using the controllable valves or other controllable diverters (by the electronics 160 or other controller) such that objects 55 extracted by one vacuum extractor device 110 of assembly 100 may be routed to a different receptacle 135 than objects 55 extracted by another one vacuum extractor device 110 of assembly 100. Moreover, if a receptacle 135 is reaching full capacity, the ducting 130 may be re-configured to route extracted objects 55 to a different receptacle 135. For example, FIG. 1 shows that the ducting 130 can be reconfigured to route extracted objects 55 to different receptacles 135.

In some embodiments, vacuum control system 140 utilizes an air manifold 143 or some other pressurized air distribution mechanism. In some embodiments, the air manifold 143 may be further pneumatically coupled to the air source 145. In alternate implementations, the air source 145 may comprise a blower, an air compressor, a compressed air storage tank, or some combination thereof. Although this disclosure may refer to "air" with regards to "airflow", "air compressor" and other elements, it should be understood that the term "air" is used in a generic sense to refer to any compressible gas or mixture of gasses.

The air manifold 143 may comprise a series of control valves 147 that may operate in response to control signal generated by the sorting control logic and electronics 160. As such, to communicate control signals, sorting control logic and electronics 160 may further comprise elements to generate electrical and/or control pneumatic signals to the vacuum extraction assembly 100. In some embodiments, the control signals may be used to turn the suction force applied by a vacuum extractor device 110 on or off. In some embodiments, the control signals may adjust a control valve 147 to vary air flow applied to a vacuum extractor device 110 and thus regulate a vacuum force applied by that vacuum extractor device 110 on a target object 55. In still other embodiments, the vacuum extractor device 110 may be optionally configured to use the air flow from the air manifold 143 to produce a reverse airflow through the vacuum extractor device 110, for example, in order to blow out material that may have become lodged in the intake of the vacuum extractor device 110. In some embodiments, reversal of airflow through vacuum extractor device 110 may be controlled by the sorting control logic and electronics 160.

In some embodiments, each vacuum extractor device 110 may use a sensor (for example, at their outlet) to send feedback to the sorting control logic and electronics 160 when a collected item fully passes through the vacuum extractor device 110, or to indicate when a collected item has not fully passed through the vacuum extractor device 110 (for example, become lodged). This will allow the sorting control logic and electronics 160 to operate the air manifold 143, valves 147 and or vacuum extractor device 110 to turn off the vacuum force off at the appropriate time (and conserve energy) and/or reverse the airflow through a vacuum extraction device 110 if necessary. Similarly, the sensor output may be used to detect a clog or jam and trigger raising or lowering of the vacuum extraction assembly 100. Such a sensor is not limited to any particular technology, and may comprise, for example, a pressure sensor, ultrasonic sensor, infrared sensor, opacity sensor, or the like.

Figure 1B:
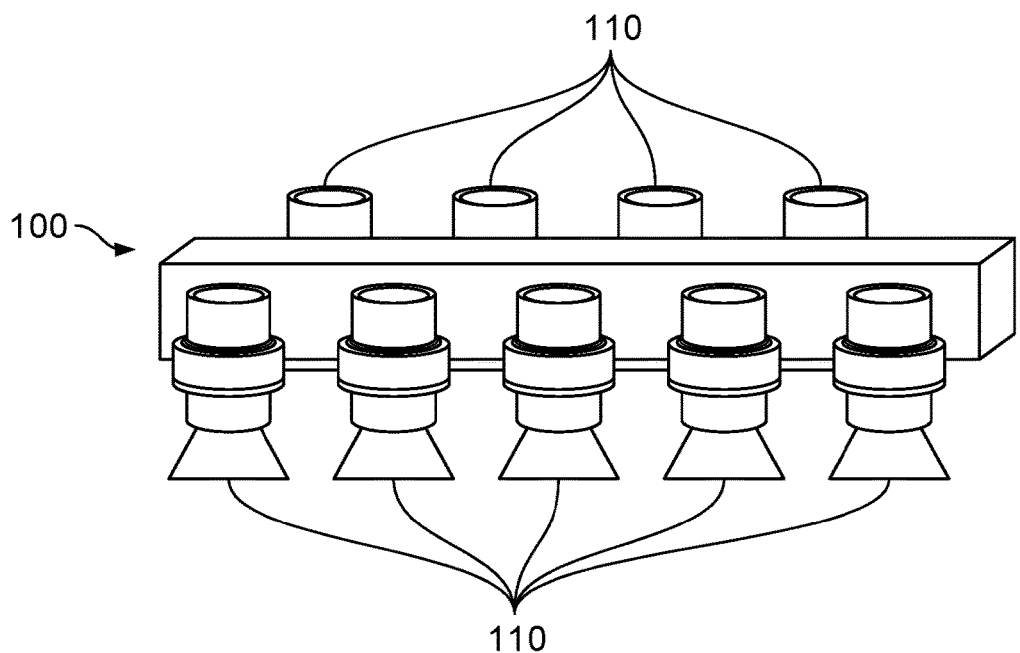
FIGS. 1B and 1C are diagram illustrating alternate vacuum extraction device arrangements for an example vacuum extraction assemblies of the present disclosure.
Figure 1C:
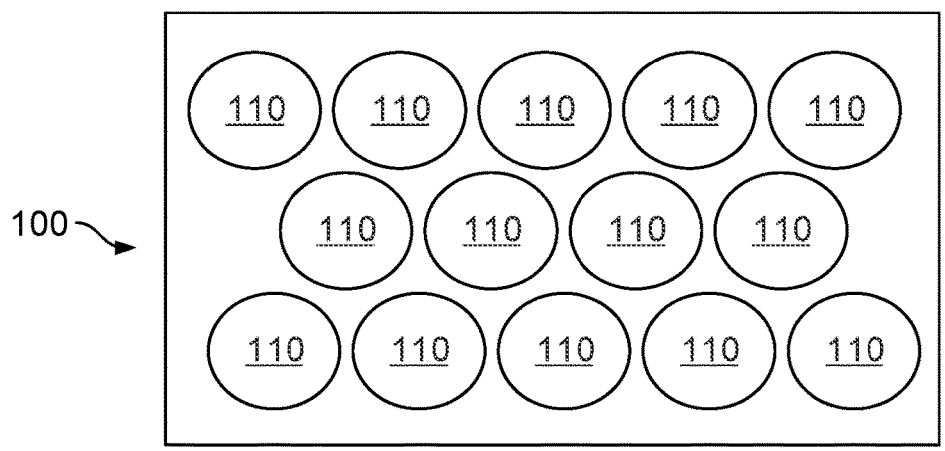

It should be understood that in alternate implementations, the vacuum extractor devices 110 may be positioned on the vacuum extraction assembly 100 in various arrangements or geometries. That is, in some embodiments, the vacuum extraction assembly 100 may comprise a single row of vacuum extraction devices 110 arranged in a line across the conveyor device 50 perpendicular with respect to the direction of material travel. In other embodiments, such as shown in FIG. 1B and FIG. 1C, the vacuum extraction assembly 100 may comprise a plurality of rows of vacuum extraction devices 110, where vacuum extraction devices 110 of one row are offset from the vacuum extraction devices 110 of another row so that material that pass between vacuum extraction devices 110 may be better aligned to the vacuum extraction devices 110 of the next row for capture. As such the sorting control logic and electronics 160 may actuate the vacuum extraction device 110 best aligned for capturing a target device 55 (for example, based on a position of the target device 55 on the conveyor 50 as determined from a captured image). However, it should also be understood that in some embodiments, a vacuum extraction assembly 100 may comprise only a single vacuum extraction device 110.

Where the vacuum extraction assembly 100 does comprise a plurality of vacuum extraction devices 110, they need not be uniform in size. For example, a vacuum extraction assembly 100 may comprise one or more vacuum extraction devices 110 of a first size, and one or more vacuum extraction devices 110 of a second size. They also need not be uniform in geometry. For example, the sorting control logic and electronics 160 may determine that the a target object 55 has a certain characteristic (for example, size, shape, orientation, material type or composition or any other characteristic discernable by the sorting control logic and electronics 160) and correlated that characteristic with a specific vacuum extraction device 110 of the vacuum extraction assembly 100 best suited for capturing objects having that characteristic. Vacuum extraction device 110 with wider diameters may be used for flexible materials like bags and sheets with smaller diameters best for more ridged objects. For example, an object identified as being a disposable ground-coffee pod may be selected for extraction by a first vacuum extraction device 110 of a first size, while a sheet of plastic wrap may be selected for extraction by a first vacuum extraction device 110 of a second size. In some embodiments, the Neural Processing Units 164 outputs one or more physical object attributes determined by the one or more Neural Processing Units based on the visional inspection of the one or more target objects appearing in captured image frames.

Because operation of the vacuum extraction assembly 100, in some embodiments, may be substantially motionless, the cost of installation and maintenance will remain substantially lower than dynamic robots. Blockage in the vacuum extraction devices 110 can more easily be removed, allowing reliable and continuous removal of target object 55 from the conveyor 50. In some embodiments, adjustments can be made on the conveyor 50 to increase or focus flow, including but not limited to adding perforations on the belt, replacing the belt with a material that allows air to flow through it, or gaps in the conveyor beneath the vacuums. The control air may be optimized by adding sensors (for example, to the inlet or outlet of the vacuum extractor devices 110) to determine when to disable flow or adding air pressure amplifiers to the system. In some embodiments, the addition of accessories (such as at 210) at the inlet of the vacuum extractor devices 100, such as but not limited to longer, spiraled, frictionless, or wider funnels, sorters or shredders add versatility, allowing adjustments to accommodate target objects 55 of many shapes, sizes, rigidity and densities. This could make the removal of materials smaller in size—such as bottle caps—or lower in density—such as paper or plastic film—economically viable. Using the vacuum extraction assembly 100 will therefor allow material recovery facilities to expend more effort into collecting hard-to-recycle items (for example, like those with less than three square inches of surface area or non-rigid materials such as plastic film or paper). It will also help increase the worth of recovered material by removing contaminants such as thin film from the stream.

It should be understood that components, elements and features of any of the embodiments described herein may be used in combination. Moreover, it should be understood that in some embodiments, vacuum sorting system 10 may be used in combination or conjunction with robotic sorting systems such as those comprising suction grippers. As such, other embodiments are intended to include sorting systems that may comprise both suctions grippers and a vacuum extraction assembly as described herein.

In addition to the embodiments described above, additional features may include: the vacuum extraction assembly 100 comprising a series of inlets configured to produce a channeled vacuum flow placed over a conveyor, for use in removing objects from the conveyor and conveying them to a deposit location, where the choice of enabling suction for object removal is governed by a computer vision system. A vacuum extraction assembly 100 wherein the vacuum flow is created by a straight-through Venturi or Coanda vacuum generator that utilizes compressed air for the generation of the vacuum and is placed inline in the vacuum channel. A vacuum extraction assembly 100 wherein the vacuum flow is enabled or disabled through the use of a valve controlling compressed air to the vacuum generator. A vacuum extraction assembly 100 wherein the object recognition device 162 is configured for detecting non-visible electromagnetic radiation, such as a hyperspectral camera, infrared, or ultraviolet sensor; a magnetic sensor; a capacitive sensor; or other sensors commonly used in the field of industrial automation. A vacuum extraction assembly 100 wherein the sorting control logic and electronics 160 is one that uses a set of parameters for identification on a series of color photos provided by a camera, and where the parameters have been trained using machine learning. A vacuum extraction assembly 100 wherein a vacuum extractor 110 inlet has an attachment to channel flow. A vacuum extraction assembly 100 used in conjunction with a conveyor mechanism 50 or conveyor belt 50 that comprises holes 51. A vacuum extraction assembly 100 wherein the vacuum is generated by a blower, and the vacuum is disabled by flooding the vacuum inlet with compressed air. A vacuum extraction assembly 100 wherein the vacuum outlet has a sensor to detect the passing of target materials and determine when the airflow must be disabled. A vacuum extraction assembly 100 wherein the source of air is amplified to produce higher inlet pressures thus higher flow rates. A vacuum extraction assembly 100 wherein the conveyor has a lower coefficient of friction due to airflow through a porous conveyor belt. A vacuum extraction assembly 100 with inlets comprising an accessory with a specific angle to guide larger but non-rigid material through the vacuum and prevent blockage upon entry. A vacuum extraction assembly 100 wherein the hoses attached to a Venturi outlet channel objects to a separate object disposal location. A vacuum extraction assembly 100 wherein the inlet and exhaust of a vacuum generator are augmented by fitting to improve the flow through the use of a converging cone on the inlet, and a diverging cone on the exhaust. A vacuum extraction assembly 100 wherein multiple units of an object recognition device 162 are placed between individual vacuum extraction assemblies to provide feedback as target objects move. A vacuum extraction assembly wherein the vacuum extraction assemblies are positioned to follow a mechanism that singulates the stream of materials and guarantees a single layer of objects for higher recovery. A vacuum extraction assembly wherein there are attachments at the inlets to allow separation of target materials from items that may be attached to it at the time of recovery. In some embodiments, the attachments comprising teeth configured to shred materials entering a vacuum extracting device. In some embodiments, the attachments comprising sorting features configured to separate target objects and destroy undesired materials.

Figure 5:
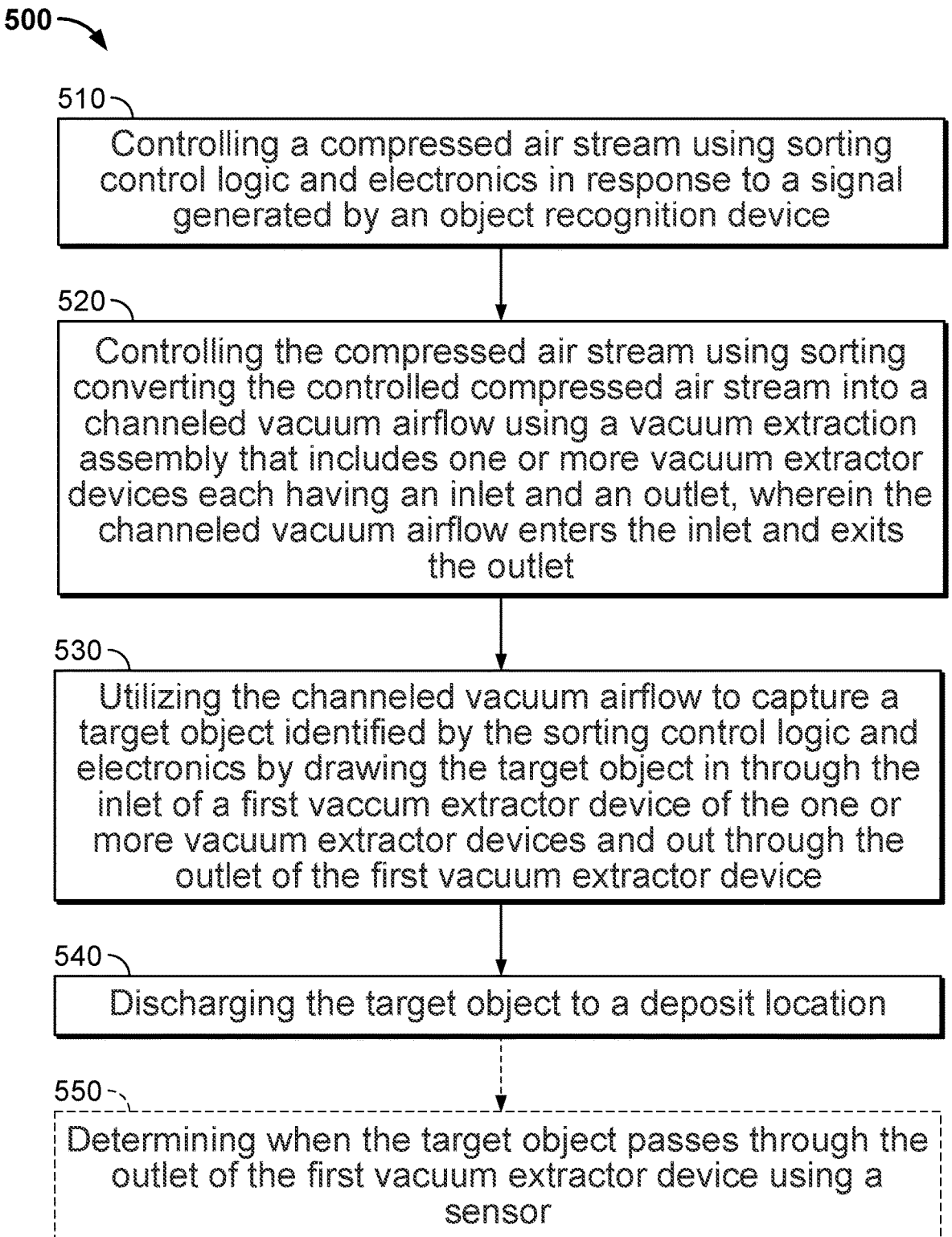
FIG. 5 is a flow chart illustrating one embodiment of a method for vacuum extraction for material sorting applications.

FIG. 5 is a flow chart illustrating one embodiment of a method for vacuum extraction for material sorting applications. It should be understood that the features and elements described herein with respect to the method 500 shown in FIG. 5 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 5 may apply to like named or described elements for any of the other figures and embodiments and vice versa.

The method 500 begins at 510 with controlling a compressed air stream using sorting control logic and electronics in response to a signal generated by an object recognition device. As described above, the object recognition device may be any form of sensing apparatus for detecting a target object for extraction, and may for example comprise a camera, an infrared camera, a non-visible electromagnetic radiation sensor, a magnetic sensor or a capacitive sensor, or some combination of such sensors. The sensing apparatus captures one or more characteristics about the target object, including but not limited to the material, location, relation to nearby objects, and other features.

As shown at 520, the method 500 further includes converting the controlled compressed air stream into a channeled vacuum airflow using a vacuum extraction assembly that includes one or more vacuum extractor devices each having an inlet and an outlet, wherein the channeled vacuum airflow enters the inlet and exits the outlet. In some embodiments, the vacuum extraction assembly may comprise a plurality of individual vacuum extractor devices. In some embodiments, the vacuum extraction assembly comprises a plurality of vacuum extractor devices individually operated by the sorting control logic and electronics via a respective controlled compressed air stream.

For example, the using sorting control logic and electronics can select which of the vacuum extractor devices to activate based upon the location of the target object, the material composition of the object, and other factors or characteristics of the object as detected or identified by the sorting control logic and electronics. The compressed air stream associated with the selected vacuum extractor device(s) is then controlled in response to a signal generated by the control logic and electronics. The signal to actuate the capture action may controlled in part by timing logic—time-based, mechanical, or otherwise—that determines the optimal time to attempt to extract the object.

In some embodiments, a conveyor mechanism may be used to channel the target object past the object recognition device and towards the vacuum extraction assembly. Such a conveyor mechanism may comprise, but is not necessarily limited to, a conveyor belt. In some embodiments, the conveyor mechanism may comprise one or more raised features, recessed features, or perforation features, configured to provide airflow for intake into the channeled vacuum airflow (for example, holes, cleats, treads, or surface textures).

The method 500 proceeds to 530 with utilizing the channeled vacuum airflow to capture a target object identified by the sorting control logic and electronics by drawing the target object in through the inlet of a first vacuum extractor device of the one or more vacuum extractor devices and out through the outlet of the first vacuum extractor device. The method 500 proceed then to 540 with discharging the target object to a deposit location. The deposit location may comprise any form of holding bin, tank, bunker, vehicle, or other receptacle where extracted objects are deposited. In some embodiments, the method 500 may optionally further proceed to 550 with determining when the target object passes through the outlet of the first vacuum extractor device using a sensor. The sorting control logic and electronics may then take further actions in response to a signal from that sensor. For example, failure to sense a successful passage our from the outlet of a vacuum extractor device may be an indication that the capture action failed (e.g., that the identified target object was missed or that a sufficient airflow to lift the target object into the inlet was not applied). Alternatively failure to sense a successful passage our from the outlet of a vacuum extractor device may be an indication that the that vacuum extractor device has become jammed or clogged. In this case, the sorting control logic and electronics may respond by reversing the airflow through the vacuum extractor device as described above to eject the clogged material from the inlet. These examples are not intended to be limiting. In other embodiments, other action may be performed by the logic in response to the detection of an obstruction.

EXAMPLE EMBODIMENTS

Example 1 includes a vacuum object sorting system, the system comprising: a vacuum extraction assembly that includes at least one vacuum extractor device having an inlet and an outlet, wherein the at least one vacuum extractor device is configured to convert a controlled compressed air stream into a channeled vacuum airflow entering the inlet and exiting the outlet; and an object recognition device coupled to sorting control logic and electronics, wherein the controlled compressed air stream is controlled by the sorting control logic and electronics in response to an signal generated by the object recognition device; wherein the at least one vacuum extractor device is configured to capture a target object identified by the sorting control logic and electronics utilizing the channeled vacuum airflow, and further utilizing the channeled vacuum airflow, to pass the target object through the inlet and outlet to a deposit location.

Example 2 includes the system of example 1, wherein the vacuum extraction assembly comprises a plurality of vacuum extractor devices individually operated by the sorting control logic and electronics via a respective controlled compressed air stream.

Example 3 includes the system of example 2, wherein a first vacuum extractor device of the plurality of vacuum extractor devices is selected for operation to capture the target object based on a characteristic of the target objection identified by the sorting control logic and electronics.

Example 4 includes the system of example 3, wherein the characteristic comprises one or more of a size, a shape, an orientation, a material type, or a material composition of the target object.

Example 5 includes the system of any of examples 1-4, wherein the at least one vacuum extractor device comprises a sensor that detects when the target object passes through the at least one vacuum extractor device.

Example 6 includes the system of example 5, wherein the sensor sends a feedback signal to the sorting control logic and electronics; wherein the sorting control logic and electronics controls the controlled compressed air stream in response to the feedback signal.

Example 7 includes the system of any of examples 5-6, wherein the sorting control logic and electronics controls detect an obstruction based on the feedback signal.

Example 8 includes the system of any of examples 1-7, wherein the object recognition device comprises at least one of: a camera, an infrared camera, a non-visible electromagnetic radiation sensor, a magnetic sensor or a capacitive sensor.

Example 9 includes the system of any of examples 1-8, further comprising a conveyor mechanism configured to channel the target object past the object recognition device and towards the vacuum extraction assembly.

Example 10 includes the system of example 9, wherein the conveyor mechanism comprises one or more raised features, recessed features, or perforation features, configured to provide airflow for intake into the channeled vacuum airflow.

Example 11 includes the system of any of examples 1-10, further comprising a ducting system coupled to the outlet of the at least one vacuum extractor device, further comprising a ducting system coupled to the outlet of the at least one vacuum extractor device, wherein the ducting system is reconfigurable to direct individual target objects to one of a plurality of different receptacles.

Example 12 includes the system of any of examples 1-11, wherein the sorting control logic and electronics comprises one or more neural processing units, wherein the one or more neural processing units distinguish the target object from one or more non-target based on a neural network parameter set.

Example 13 includes the system of example 12, wherein the one or more neural processing units further identify predefined characteristics of the target object based on the neural network parameter set.

Example 14 includes a method for vacuum object sorting, the method comprising: controlling a compressed air stream using sorting control logic and electronics in response to a signal generated by an object recognition device; controlling the compressed air stream using sorting converting the controlled compressed air stream into a channeled vacuum airflow using a vacuum extraction assembly that includes one or more vacuum extractor devices each having an inlet and an outlet, wherein the channeled vacuum airflow enters the inlet and exits the outlet; utilizing the channeled vacuum airflow to capture a target object identified by the sorting control logic and electronics by drawing the target object in through the inlet of a first vacuum extractor device of the one or more vacuum extractor devices and out through the outlet of the first vacuum extractor device; and discharging the target object to a deposit location.

Example 15 includes the method of example 14, wherein the vacuum extraction assembly comprises a plurality of vacuum extractor devices individually operated by the sorting control logic and electronics via a respective controlled compressed air stream.

Example 16 includes the method of example 15, further comprising: selecting the first vacuum extractor device for operation to capture the target object based on a characteristic of the target objection identified by the sorting control logic and electronics.

Example 17 includes the method of any of examples 14-16, wherein the first vacuum extractor device comprises a sensor that detects when the target object passes through the at least one vacuum extractor device and sends a feedback signal to the sorting control logic and electronics, the method further comprising: controlling the controlled compressed air stream in response to the feedback.

Example 18 includes the method of any of examples 14-17, wherein the object recognition device comprises at least one of: a camera, an infrared camera, a non-visible electromagnetic radiation sensor, a magnetic sensor or a capacitive sensor.

Example 19 includes the method of any of examples 14-18, further comprising: channeling the target object past the object recognition device and towards the vacuum extraction assembly utilizing a conveyor mechanism.

Example 20 includes the method of example 19, wherein the conveyor mechanism comprises one or more raised features, recessed features, or perforation features, configured to provide airflow for intake into the channeled vacuum airflow.

In various alternative embodiments, system elements, method steps, or examples described throughout this disclosure (such as the sorting control logic and electronics, vacuum control system, neural processing units and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "sorting control logic and electronics", "vacuum control system", "vacuum extraction assembly", "vacuum extractor device", "imaging device", "neural processing units", "data storage", "memory device", "memory", "neural network parameter set", "controller", "controls", "processor", or "microprocessor", each refer to non-generic device elements that would be recognized and understood by those of skill in the art and are not used herein as nonce words or nonce terms for the purpose of invoking 35 U.S.C. 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A vacuum object sorting system, the system comprising:
   a vacuum extraction assembly that includes at least one vacuum extractor device having an inlet and an outlet, wherein the at least one vacuum extractor device is configured to convert a controlled compressed air stream into a channeled vacuum airflow entering the inlet and exiting the outlet; and
   an object recognition device coupled to sorting control logic and electronics, wherein the controlled compressed air stream is controlled by the sorting control logic and electronics in response to a signal generated by the object recognition device;
   wherein the at least one vacuum extractor device is configured to capture a target object identified by the sorting control logic and electronics utilizing the channeled vacuum airflow, and further utilizing the channeled vacuum airflow, to pass the target object through the inlet and the outlet to a deposit location, wherein the at least one vacuum extractor device comprises a sensor that detects when the target object passes through the at least one vacuum extractor device.

2. The system of claim 1, wherein the vacuum extraction assembly comprises a plurality of vacuum extractor devices individually operated by the sorting control logic and electronics via a respective controlled compressed air stream.

3. The system of claim 2, wherein a first vacuum extractor device of the plurality of vacuum extractor devices is selected for operation to capture the target object based on a characteristic of the target object identified by the sorting control logic and electronics.

4. The system of claim 3, wherein the characteristic comprises one or more of a size, a shape, an orientation, a material type, or a material composition of the target object.

5. The system of claim 1, wherein the sensor sends a feedback signal to the sorting control logic and electronics; wherein the sorting control logic and electronics controls the controlled compressed air stream in response to the feedback signal.

6. The system of claim 1, wherein the sorting control logic and electronics detect an obstruction based on a feedback signal.

7. The system of claim 1, wherein the object recognition device comprises at least one of:
   a camera, an infrared camera, a non-visible electromagnetic radiation sensor, a magnetic sensor or a capacitive sensor.

8. The system of claim 1, further comprising a conveyor mechanism configured to channel the target object past the object recognition device and towards the vacuum extraction assembly.

9. The system of claim 8, wherein the conveyor mechanism comprises one or more raised features, recessed features, or perforation features, configured to provide airflow for intake into the channeled vacuum airflow.

10. The system of claim 1, further comprising a ducting system coupled to the outlet of the at least one vacuum extractor device, wherein the ducting system is reconfigurable to direct individual target objects to one of a plurality of different receptacles.

11. The system of claim 1, wherein the sorting control logic and electronics comprises one or more neural processing units, wherein the one or more neural processing units distinguish the target object from one or more non-target objects based on a neural network parameter set.

12. The system of claim 11, wherein the one or more neural processing units further identify predefined characteristics of the target object based on the neural network parameter set.

13. A method for vacuum object sorting, the method comprising:
controlling a compressed air stream using sorting control logic and electronics in response to a signal generated by an object recognition device;
controlling the compressed air stream using sorting converting the controlled compressed air stream into a channeled vacuum airflow using a vacuum extraction assembly that includes one or more vacuum extractor devices each having an inlet and an outlet, wherein the channeled vacuum airflow enters the inlet and exits the outlet;
utilizing the channeled vacuum airflow to capture a target object identified by the sorting control logic and electronics by drawing the target object in through the inlet of a first vacuum extractor device of the one or more vacuum extractor devices and out through the outlet of the first vacuum extractor device, wherein the first vacuum extractor device comprises a sensor that detects when the target object passes through the first vacuum extractor device and sends a feedback signal to the sorting control logic and electronics;
controlling the controlled compressed air stream in response to the feedback signal; and
discharging the target object to a deposit location.

14. The method of claim 13, wherein the vacuum extraction assembly comprises a plurality of vacuum extractor devices individually operated by the sorting control logic and electronics via a respective controlled compressed air stream.

15. The method of claim 14, further comprising:
selecting the first vacuum extractor device for operation to capture the target object based on a characteristic of the target object identified by the sorting control logic and electronics.

16. The method of claim 13, wherein the object recognition device comprises at least one of:
a camera, an infrared camera, a non-visible electromagnetic radiation sensor, a magnetic sensor, or a capacitive sensor.

17. The method of claim 13, further comprising:
channeling the target object past the object recognition device and towards the vacuum extraction assembly utilizing a conveyor mechanism.

18. The method of claim 17, wherein the conveyor mechanism comprises one or more raised features, recessed features, or perforation features, configured to provide airflow for intake into the channeled vacuum airflow.

19. A vacuum object sorting system, the system comprising:
a vacuum extraction assembly that includes at least one vacuum extractor device having an inlet and an outlet, wherein the at least one vacuum extractor device is configured to convert a controlled compressed air stream into a channeled vacuum airflow entering the inlet and exiting the outlet;
an object recognition device coupled to sorting control logic and electronics, wherein the controlled compressed air stream is controlled by the sorting control logic and electronics in response to a signal generated by the object recognition device;
wherein the at least one vacuum extractor device is configured to capture a target object identified by the sorting control logic and electronics utilizing the channeled vacuum airflow, and further utilizing the channeled vacuum airflow, to pass the target object through the inlet and the outlet to a deposit location; and
a ducting system coupled to the outlet of the at least one vacuum extractor device, wherein the ducting system is reconfigurable to direct individual target objects to one of a plurality of different receptacles.

20. The system of claim 19, wherein the vacuum extraction assembly comprises a plurality of vacuum extractor devices individually operated by the sorting control logic and electronics via a respective controlled compressed air stream.

21. The system of claim 20, wherein a first vacuum extractor device of the plurality of vacuum extractor devices is selected for operation to capture the target object based on a characteristic of the target object identified by the sorting control logic and electronics.

22. The system of claim 21, wherein the characteristic comprises one or more of a size, a shape, an orientation, a material type, or a material composition of the target object.

23. The system of claim 19, wherein the object recognition device comprises at least one of:
a camera, an infrared camera, a non-visible electromagnetic radiation sensor, a magnetic sensor, or a capacitive sensor.

24. The system of claim 19, further comprising a conveyor mechanism configured to channel the target object past the object recognition device and towards the vacuum extraction assembly.

25. The system of claim 24, wherein the conveyor mechanism comprises one or more raised features, recessed features, or perforation features, configured to provide airflow for intake into the channeled vacuum airflow.

26. The system of claim 19, wherein the sorting control logic and electronics comprises one or more neural processing units, wherein the one or more neural processing units distinguish the target object from one or more non-target objects based on a neural network parameter set.

27. The system of claim 26, wherein the one or more neural processing units further identify predefined characteristics of the target object based on the neural network parameter set.

* * * * *

UNITED STATES PATENT AND TRADEMARK OFFICE
CERTIFICATE OF CORRECTION

PATENT NO. : 11,136,223 B2
APPLICATION NO. : 16/559299
DATED : October 5, 2021
INVENTOR(S) : Sato et al.

Page 1 of 1

It is certified that error appears in the above-identified patent and that said Letters Patent is hereby corrected as shown below:

In the Specification

In Column 10, Line(s) 39, after "magnetic sensor", insert --,--.
In Column 12, Line(s) 22, after "magnetic sensor", insert --,--.
In Column 13, Line(s) 20, after "magnetic sensor", insert --,--.

In the Claims

In Column 14, Line(s) 58, Claim 7, after "magnetic sensor", insert --,--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*